(12) United States Patent
Boyer et al.

(10) Patent No.: US 10,458,425 B2
(45) Date of Patent: Oct. 29, 2019

(54) CONICAL LOAD SPREADER FOR COMPOSITE BOLTED JOINT

(71) Applicant: General Electric Company, Schenectady, NY (US)

(72) Inventors: Mitchell Harold Boyer, Cincinnati, OH (US); Kevin Daniel Gordin, Liberty Township, OH (US); Stephanie Glynn Cotten, Wilmington, OH (US); James Kenton Pullins, Madeira, OH (US)

(73) Assignee: General Electric Company, Schenectady, NY (US)

( * ) Notice: Subject to any disclaimer, the term of this patent is extended or adjusted under 35 U.S.C. 154(b) by 831 days.

(21) Appl. No.: 15/171,048

(22) Filed: Jun. 2, 2016

(65) Prior Publication Data

US 2017/0350413 A1    Dec. 7, 2017

(51) Int. Cl.
*F01D 11/00* (2006.01)
*F04D 29/32* (2006.01)
(Continued)

(52) U.S. Cl.
CPC .......... *F04D 29/329* (2013.01); *F01D 11/008* (2013.01); *F04D 29/023* (2013.01);
(Continued)

(58) Field of Classification Search
None
See application file for complete search history.

(56) References Cited

U.S. PATENT DOCUMENTS

| 1,592,525 A | 7/1926 | Hosking |
| 1,725,440 A | 8/1929 | Carns |

(Continued)

FOREIGN PATENT DOCUMENTS

| EP | 2 090 749 A2 | 8/2009 |
| EP | 2503102 A2 | 9/2012 |

(Continued)

OTHER PUBLICATIONS

International Search Report and Written Opinion issued in connection with corresponding PCT Application No. PCT/US2017/033211 dated Sep. 6, 2017.

*Primary Examiner* — Jason D Shanske
*Assistant Examiner* — Theodore C Ribadeneyra
(74) *Attorney, Agent, or Firm* — Dority & Manning, P.A.

(57) ABSTRACT

Composite fan blade platform includes forward and aft portions and transition portion therebetween. Platform mounting holes extend through increased section thickness in transition portion and conical countersinks centered about centerlines of mounting holes extend into transition portion. Bolts include bolt shanks extending away from boltheads through center bolt holes in conical load spreaders in conical countersink. Boltheads engage conical load spreader. Bolthead is disposed entirely within cylindrical counterbore into top of load spreader and engages shoulder at bottom of cylindrical counterbore. Radial gap between bolthead and cylindrical counterbore surface of cylindrical counterbore may be filled by filler or filler ring. Bolts may join platform supports to disk hooks attached, fixed or joined to, or integral with disk posts of disk. Nuts threaded on threaded inner end of bolt shank may secure bases attached to platform supports to fan blade platform.

25 Claims, 8 Drawing Sheets

(51) Int. Cl.
*F04D 29/02* (2006.01)
*F04D 29/34* (2006.01)
*F04D 29/64* (2006.01)

(52) U.S. Cl.
CPC ........... *F04D 29/34* (2013.01); *F04D 29/644* (2013.01); *F05D 2220/36* (2013.01); *F05D 2300/603* (2013.01); *Y02T 50/672* (2013.01)

(56) References Cited

U.S. PATENT DOCUMENTS

| | | | | |
|---|---|---|---|---|
| 3,712,757 | A * | 1/1973 | Goodwin | F01D 5/28 416/193 R |
| 5,499,782 | A * | 3/1996 | Domine | B32B 5/28 244/1 A |
| 6,217,283 | B1 | 4/2001 | Ravenhall et al. | |
| 6,447,250 | B1 | 9/2002 | Corrigan et al. | |
| 6,447,255 | B1 * | 9/2002 | Bagnall | F01D 5/066 277/626 |
| 6,634,863 | B1 | 10/2003 | Forrester et al. | |
| 6,942,462 | B2 * | 9/2005 | Breakwell | B64C 11/14 416/245 R |
| 7,163,375 | B2 | 1/2007 | Queriault et al. | |
| 7,311,493 | B2 | 12/2007 | Remy et al. | |
| 8,215,910 | B2 * | 7/2012 | Belmonte | B64C 11/14 416/144 |
| 8,827,651 | B2 | 9/2014 | Bottome | |
| 8,851,850 | B2 | 10/2014 | Hoyland et al. | |
| 2002/0102160 | A1 * | 8/2002 | Breakwell | B64C 11/14 415/219.1 |
| 2009/0214354 | A1 | 8/2009 | Bagnall | |
| 2011/0038731 | A1 | 2/2011 | Evans | |
| 2011/0085914 | A1 | 4/2011 | Breakwell | |
| 2011/0243744 | A1 * | 10/2011 | Forgue | F01D 5/3007 416/204 A |
| 2012/0148388 | A1 | 6/2012 | Bottome | |
| 2014/0186187 | A1 | 7/2014 | Lamboy et al. | |
| 2014/0219805 | A1 | 8/2014 | Lamboy et al. | |

FOREIGN PATENT DOCUMENTS

| | | |
|---|---|---|
| EP | 2 666 715 A2 | 11/2013 |
| WO | 2010/108229 A1 | 9/2010 |
| WO | WO 2013173089 A1 | 11/2013 |
| WO | WO 2014149366 A1 | 9/2014 |
| WO | WO 2015073096 A3 | 7/2015 |

* cited by examiner

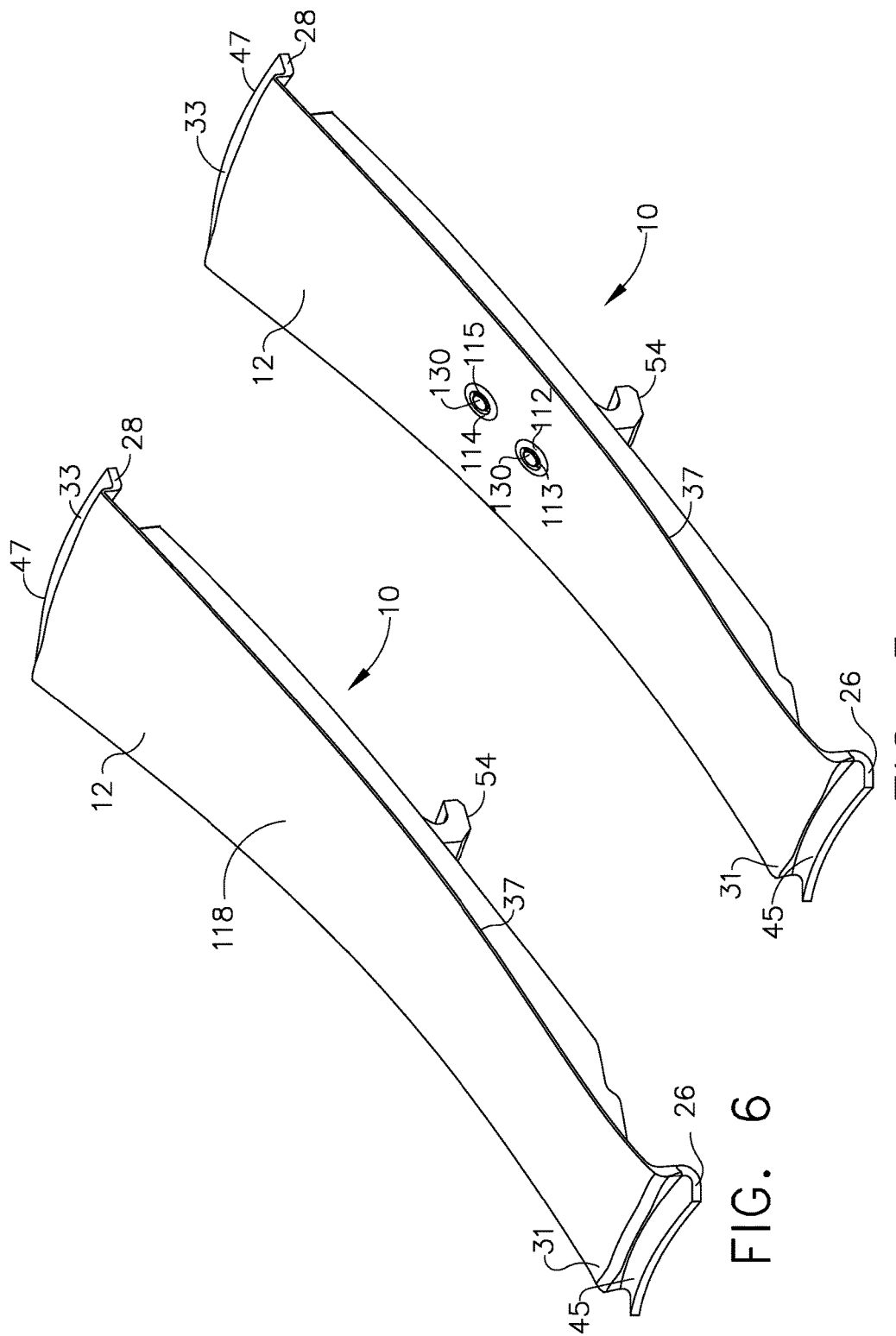

CONICAL LOAD SPREADER FOR COMPOSITE BOLTED JOINT

BACKGROUND OF THE INVENTION

The present invention relates generally to bolted composite joints and, more particularly, to a conical metal load spreader between a bolt head and a composite aircraft gas turbine fan platform.

An aircraft turbofan gas turbine engine includes a fan assembly having a plurality of circumferentially spaced apart fan blades extending radially outwardly from a rotor disk. The fan assembly typically includes a plurality of circumferentially spaced apart fan blades each having a dovetail root disposed in a complementary, axially extending dovetail groove or slot in a perimeter or rim of a rotor disk. A spinner is mounted to a front end of the fan assembly to provide smooth airflow into the fan. A radially inner flowpath boundary for the airflow channeled between the blades is provided typically by integral or non-integral platforms at the blade roots which circumferentially abut each other between adjacent fan blades.

There are often reasons for increasing the airflow through the fan blades to increase overall engine performance without increasing or holding to a limit of a tip of the fan blade. An inner flowpath boundary, often referred to as the hub, is moved radially inwardly from an existing engine design or the engine is originally designed to have, what is referred to as, a low radius hub. Low radius hubs present assembly challenges between the platforms and disk as the inner flowpath boundary tends to meet tops of disk dovetail posts at a forward end of the disk, thus, limiting the space for platform interface and mounting features.

United States Patent Application No. 2014/0186187 by Jorge Orlando Lamboy et al., published Jul. 3, 2014, entitled "NON-INTEGRAL FAN BLADE PLATFORM" and assigned to the present assignee, the General Electric Company discloses a blade platform for a low hub radius fan. The fan platform between adjacent blades is secured by mounting features to the disk. The fan platform is secured to the rotor structure or disk with lugs or overlaps with support rings. It is desirable to have a composite platform. It is also desirable to locate the forward radius of the hub air flow surface radially inward as far as mechanically feasible. This increases fan flow area and allows for improved overall engine performance. The platform design and forward radius have been limited to a certain size for past engines by the mechanical attachment of the fan platform to the fan rotor.

There remains a need for an improved mechanical attachment assembly to secure or mount a fan composite platform to a metal disk that permits a low radius hub design.

BRIEF DESCRIPTION OF THE INVENTION

To reduce fan hub radius and create the smallest radius possible, a new connection was made between the airflow surface and the fan disk using a mid span support and hook. The mid span support is a metal part. The air flow surface is formed by a composite structure. A bolted joint attaches the two pieces together and completes the connection. A load spreader and filler ring are used to increase the strength and fatigue life of the joint while eliminating all performance penalties associated with a joint in the flowpath.

A gas turbine engine fan blade platform includes a forward portion, an aft portion and a transition portion therebetween; a mounting feature for securing the fan blade platform to a disk; and a platform air flow surface on an opposite side of the fan blade platform from the mounting feature. The mounting feature includes an increased section thickness in the transition portion; one or more platform mounting holes extending through the increased section thickness in the transition portion; and one or more conical countersinks centered about one or more centerlines of the one or more platform mounting holes respectively extending into the transition portion.

The platform mounting holes and the conical countersinks may extend through a maximum thickness section of the transition portion. The platform may be made of a composite material having upwardly facing forward and aft notches in axially spaced apart forward and aft edges on the forward and aft portions respectively. A radially inward mounting surface of the mounting feature may be substantially orthogonal to the one or more centerlines.

A fan rotor assembly includes a disk circumscribing an axis of rotation; circumferentially spaced apart dovetail slots disposed about a rim of the disk and extending circumferentially between disk posts and extending axially from a forward disk end to an aft disk end; fan blades including dovetail roots disposed in the dovetail slots; and composite fan blade platforms located outward from and secured to the disk and circumferentially positioned between adjacent ones of the fan blades. Each of the fan blade platforms includes a radially outwardly facing platform air flow surface and a forward portion, an aft portion and a transition portion therebetween. A mounting feature on a radially inwardly facing side of the fan blade platform is used for securing the fan blade platform to the disk. The mounting feature has an increased section thickness in the transition portion; at least one platform mounting hole including a centerline extending through the increased section thickness in the transition portion; and a conical countersink extending into the transition portion centered around the centerline of the at least one platform mounting hole.

A clamping means for securing the transition portion of the fan blade platform to the disk may include a conical load spreader with a center bolt hole disposed in the conical countersink. A bolt including a bolthead may engage the conical load spreader and a bolt shank may extend away from the bolthead and through the center bolt hole. A cylindrical recess or counterbore may extend into a top of the conical load spreader and the bolthead may be disposed entirely within a cylindrical counterbore and rest against and engage a shoulder a bottom of the cylindrical counterbore. A radial gap between the bolthead and cylindrical counterbore surface of the cylindrical counterbore may be filled by a filler or filler ring disposed between the bolthead and the cylindrical counterbore surface. A coating may be bonded over the platform air flow surface covering the boltheads and the cylindrical counterbores.

At least one disk hook may be attached, fixed or joined to, or integral with disk posts of the disk, at least one platform support including a hook base connected to a curved platform hook arm may be bolted with the bolt to the increased section thickness of the mounting feature along a radially inward mounting surface of the mounting feature. The platform hook arm engages a disk hook arm of the disk hook and a nut threaded on a threaded inner end of the bolt shank engages an inner base surface of the base for securing the base to the fan blade platform along the radially inward mounting surface.

The fan rotor assembly may include forward and aft supports supported by forward and aft disk ends respectively of the disk and the forward and aft supports may include forward and aft overhangs mating with upwardly facing forward and aft notches in axially spaced apart forward and aft edges on the forward and aft portions respectively.

The mounting feature on the radially inwardly facing side of the fan blade platform for securing the fan blade platform to the disk may include axially spaced apart dual forward and aft platform mounting holes having forward and aft centerlines respectively extending through the increased section thickness in the transition portion. Forward and aft and conical countersinks extending into the transition portion are centered around the forward and aft centerlines respectively. The clamping means includes forward and aft and conical load spreaders disposed in the forward and aft conical countersinks and circumscribing the forward and aft centerline respectively; a center bolt hole extends through each of the forward and aft conical load spreaders; a bolt including a bolthead engages each of the forward and aft conical load spreaders; and a bolt shank extends away from the bolthead and through the center bolt hole.

BRIEF DESCRIPTION OF THE DRAWINGS

FIG. 5 is a perspective view illustration of the composite fan platform and bolt heads joining a metal hook of the bolted joint illustrated in FIG. 4.

FIG. 6 is a perspective view illustration of an erosion coating covering the bolt heads illustrated in FIG. 5.

DETAILED DESCRIPTION OF THE INVENTION

Figure 1:
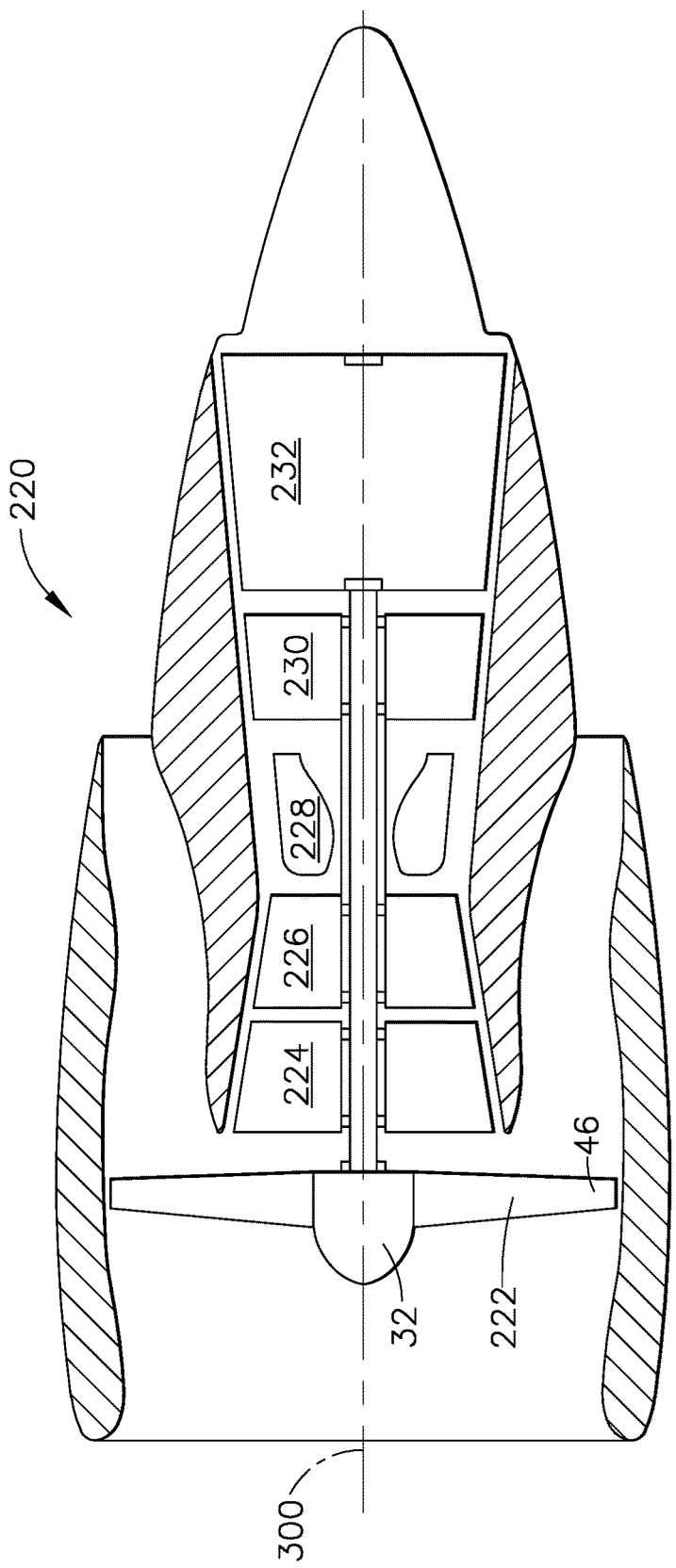
FIG. 1 is a cross-sectional view schematic illustration of a gas turbine engine having a bypass fan.

Illustrated in FIG. 1 is an exemplary gas turbine engine 220 which includes a bypass fan 222, a low pressure compressor 224, a high pressure compressor 226, a combustor 228, a high pressure turbine 230 and a low pressure turbine 232. The fan 222 includes a fan rotor assembly 400 having a disk 32, which is probably a metal disk, circumscribing an axis of rotation 300 from which extends radially outward a single axially located row of circumferentially spaced apart fan blades 46. Composite fan blade platforms 10 located outward from and secured to the disk 32 are circumferentially positioned between adjacent fan blades 46 as illustrated in FIG. 2.

Figure 2:
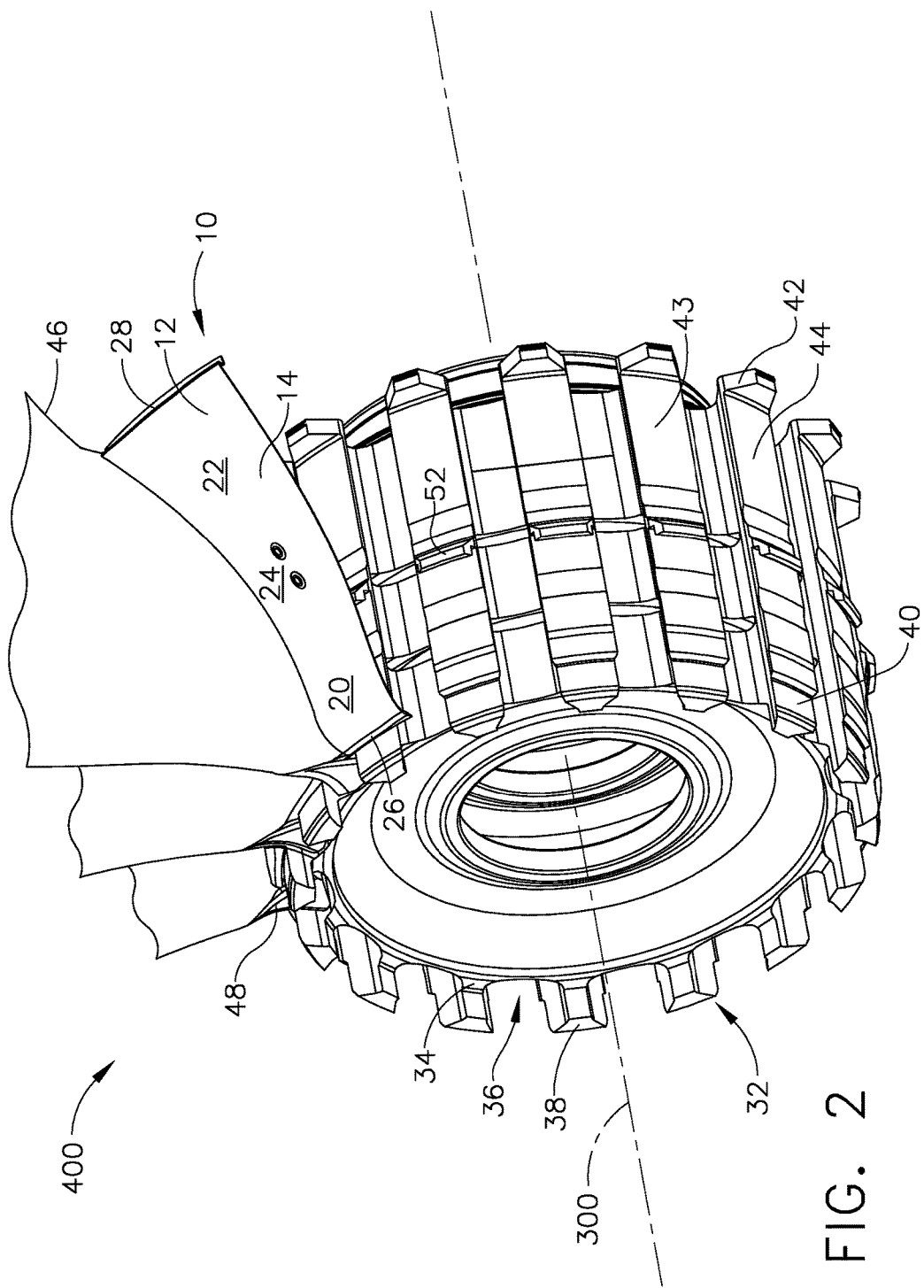
FIG. 2 is a perspective view illustration of a fan rotor assembly including a bolted joint joining a composite fan platform to a metal disk of the fan illustrated in FIG. 1.

FIG. 2 illustrates an exemplary embodiment of the rotor assembly 400 including circumferentially spaced apart dovetail slots 36 disposed about a rim 34 of the disk 32 and extending circumferentially between disk posts 38 and extending axially from a forward disk end 40 to an aft disk end 42, and extending radially inward from a disk outer surface 43 of the rim 44. The fan blades 46 include dovetail roots 48 disposed in the dovetail slots 36. Each of the fan blade platforms 10 includes a radially outwardly facing platform air flow surface 12 used to provide an inner hub airflow surface 14 or flowpath between the fan blades 46.

Figure 3:
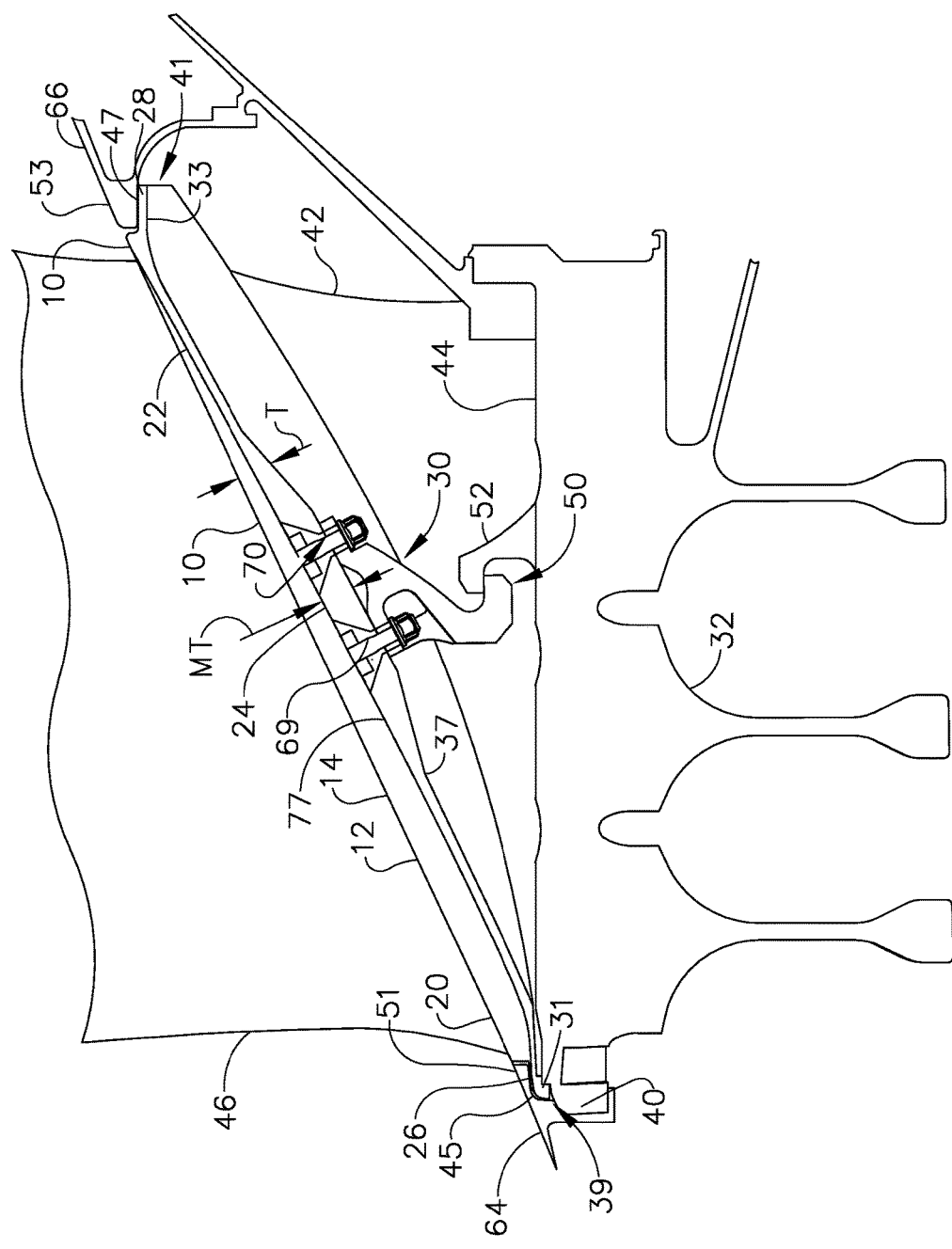
FIG. 3 is a cross-sectional view schematic illustration of the bolted joint including a conical load spreader joining the composite fan platform to the metal disk illustrated in FIG. 2.
Figure 4:
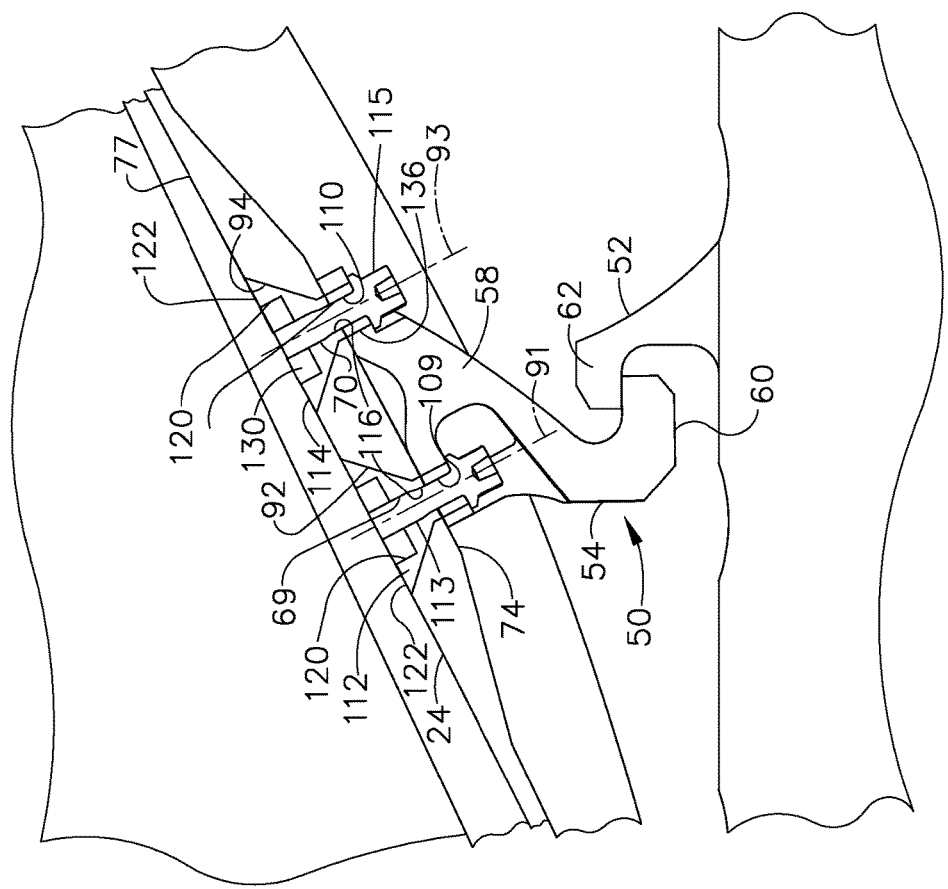
FIG. 4 is an enlarged cross-sectional view schematic illustration of the bolted joint illustrated in FIG. 3.
Figure 7:
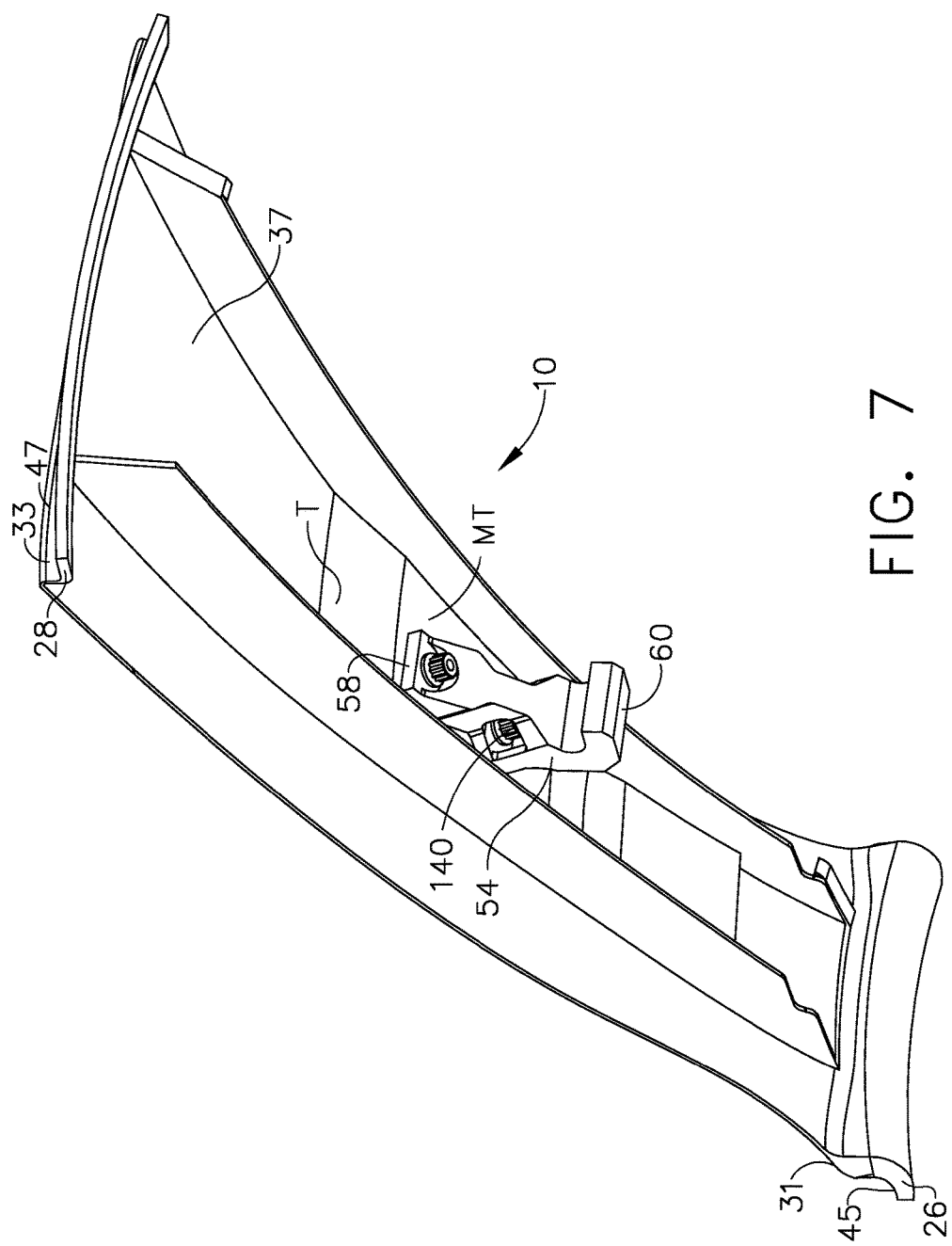
FIG. 7 is a perspective view illustration of the metal hook bolted to an underside of the composite fan platform illustrated in FIG. 3.
Figure 9:
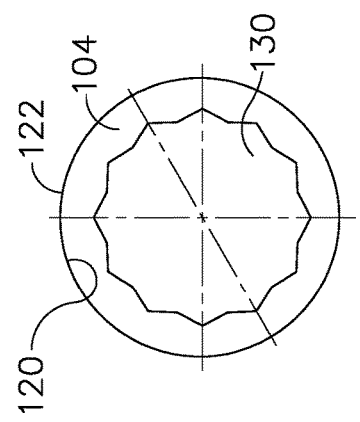
FIG. 9 is a sectional view illustration of the bolt head in the load spreader illustrated in FIG. 8.

Referring to FIGS. 2-4, each fan blade platform 10 is made of a composite material and has an axially forward mount 26 supported by a forward support 64 mounted to and supported by the forward disk end 40 of the disk 32. Each of the fan blade platforms 10 includes an aft mount 28 supported by an aft support 66 mounted to and supported by the aft disk end 42 of the disk 32. Each fan blade platform 10 has a forward portion 20 including the forward mount 26, an aft portion 22 including the aft mount 28, and a transition portion 24 therebetween.

The forward portion 20 includes a forward edge 31 that may be notched to form a forward rabbet joint 39 with the forward mount 26 and the aft portion 22 includes an aft edge 33 that may be notched to form an aft rabbet joint 41 with the aft mount 28. The forward and aft supports 64, 66 have forward and aft overhangs 51, 53 that mate with upwardly facing forward and aft notches 45, 47 in the axially spaced apart forward and aft edges 31, 33 of the fan blade platform 10 to provide the forward and aft rabbet joints 39, 41 respectfully. The forward and aft rabbet joints 39, 41 help retain the fan blade platform 10 to the disk 32.

Referring to FIGS. 3-8, the transition portion 24 has a mounting feature 30 on a radially inwardly facing side 37 of the fan blade platform 10 to secure the fan blade platform 10 to the disk 32. The exemplary embodiment of the mounting feature 30 has an increased section thickness T in the transition portion 24 in comparison to the forward and aft portions 20, 22. Along a maximum thickness section MT of the transition portion 24 and increased section thickness T in the transition portion 24 of the fan blade platform 10. Axially spaced apart dual forward and aft platform mounting holes 69, 70 having forward and aft centerlines 91, 93 extend through the maximum thickness section MT of the transition portion 24 and increased section thickness T of the mounting feature 30. The mounting feature 30 further includes a radially inward mounting surface 74 along the maximum thickness section MT of the transition portion 24 substantially orthogonal to the forward and aft centerlines 91, 93 of the forward and aft platform mounting holes 69, 70.

Dual forward and aft and conical countersinks 92, 94 extend into the maximum thickness section MT of the transition portion 24 and increased section thickness T mounting feature 30 of the fan blade platform 10. The forward and aft platform mounting holes 69, 70 and the forward and aft conical countersinks 92, 94 are concentric and centered about the forward and aft centerlines 91, 93 respectively. The forward and aft centerlines 91, 93 are substantially orthogonal to a radially outer surface 77 of the transition portion 24. A clamping means 50 secures the maximum thickness section MT of the transition portion 24 of the fan blade platform 10 to the disk 32.

An exemplary embodiment of the disk 32 illustrated herein includes disk hooks 52 attached, fixed or joined to, or integral with the disk posts 38. The clamping means 50 further includes platform supports 54 bolted to or otherwise removably mounted to the increased section thickness T mounting feature 30 along the radially inward mounting surface 74. The platform supports 54, also referred to as mid span supports, include hook bases 58 connected to curved platform hook arms 60 which engage curved disk hook arms 62 of the disk hooks 52. Each of the bases 58 include dual forward and aft base mounting holes 109, 110 extending therethrough. The forward and aft base mounting holes 109, 110 are sized and located in the hook base 58 such that they align and center about the forward and aft centerline 91, 93 of the forward and aft platform mounting holes 69, 70 in the increased section thickness T mounting feature 30 respectively.

The axially spaced apart forward and aft platform mounting holes 69, 70 provide a stable secure anti-rotation connection for the bases 58. The axially spaced apart forward and aft platform mounting holes 69, 70 provide an air gap between the forward and aft conical load spreaders 112, 114 and the radially inward mounting surface 74. The gap allows for the clamping means 50 to be applied through the composite. The disk hook and the platform support 52, 54 hook and clamp together using forward and aft bolts 113, 115 disposed through the forward and aft platform mounting holes 69, 70 and the forward and aft base mounting holes 109, 110 respectively. Dual forward and aft and conical load spreaders 112, 114 are disposed within and fit closely against the forward and aft conical countersinks 92, 94 and circumscribe the forward and aft centerline 91, 93. A center bolt hole 116 extends through each of the forward and aft conical load spreaders 112, 114.

Further referring to FIGS. 7-11, a cylindrical recess or counterbore 120 extends into a top 122 of each of the forward and aft conical load spreaders 112, 114 forming a shoulder 124 at a bottom 126 of the cylindrical counterbore 120. Conical spreader surfaces 80 of the forward and aft conical load spreaders 112, 114 and conical countersink surfaces 82 of the forward and aft and conical countersinks 92, 94 have substantially the same or equal conical angles 84. The angle is critical to the function of the load spreader. A conical angle of 80 degrees or in a range of 75-85 degrees was found to be most practical for part capability and for assembly. The conical spreader and countersink surfaces 80, 82 mate and engage each other along the conical spreader surfaces 80 and conical countersink surfaces 82.

Figure 8:
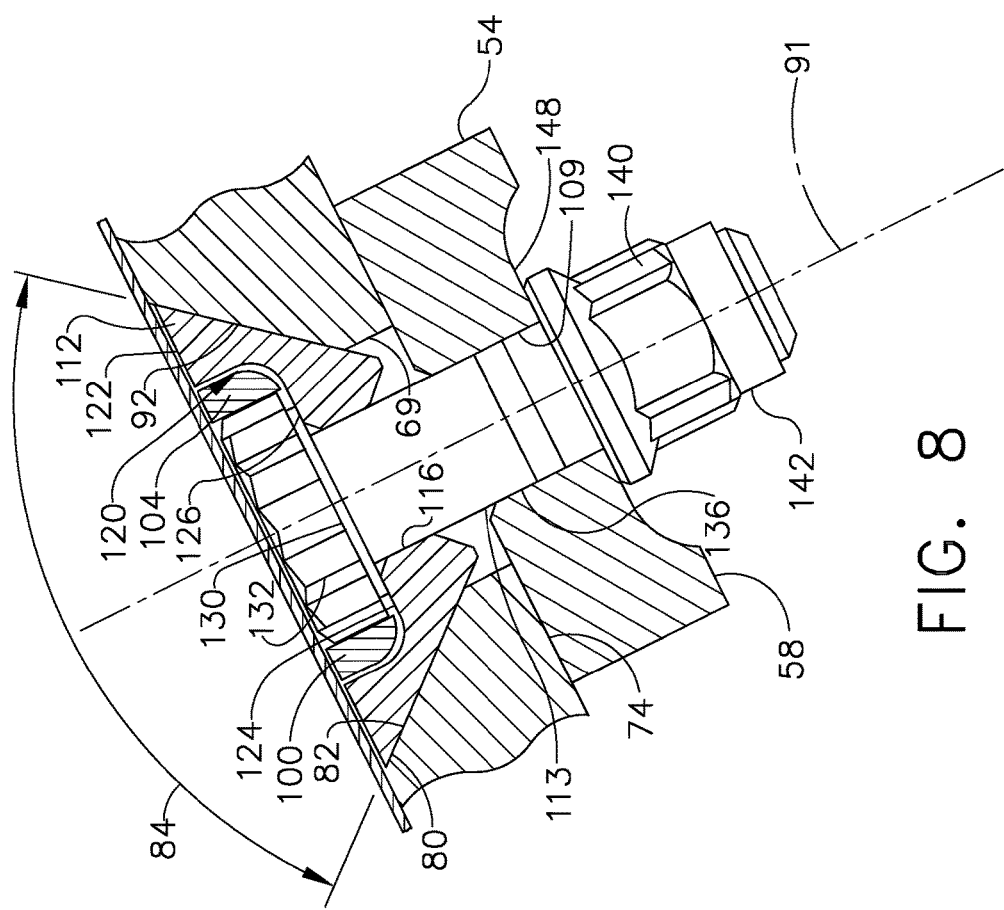
FIG. 8 is a cross-sectional view illustration of a load spreader between the composite fan platform and the metal bolt joining the metal hook to the composite fan platform illustrated in FIG. 7.
Figure 11:
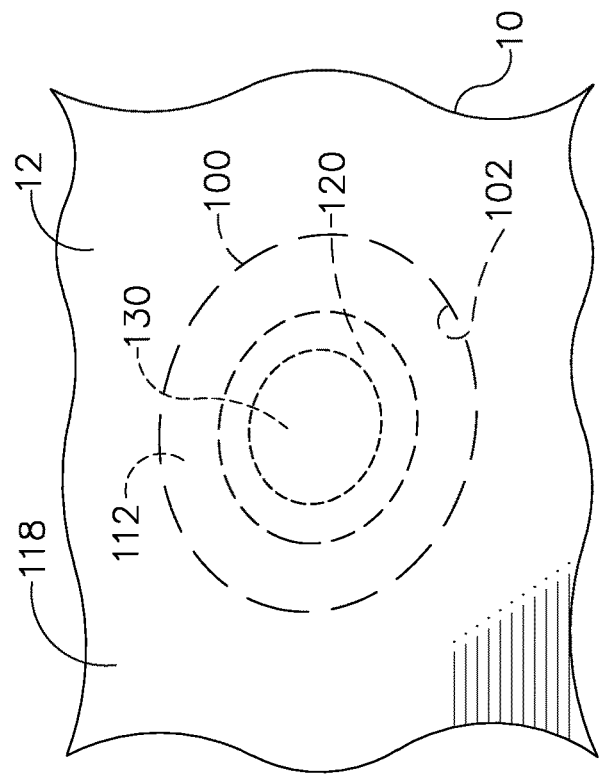
FIG. 11 is a perspective view illustration of a filler in the annular recess between the bolt head and the load spreader illustrated in FIG. 9.
Figure 10:
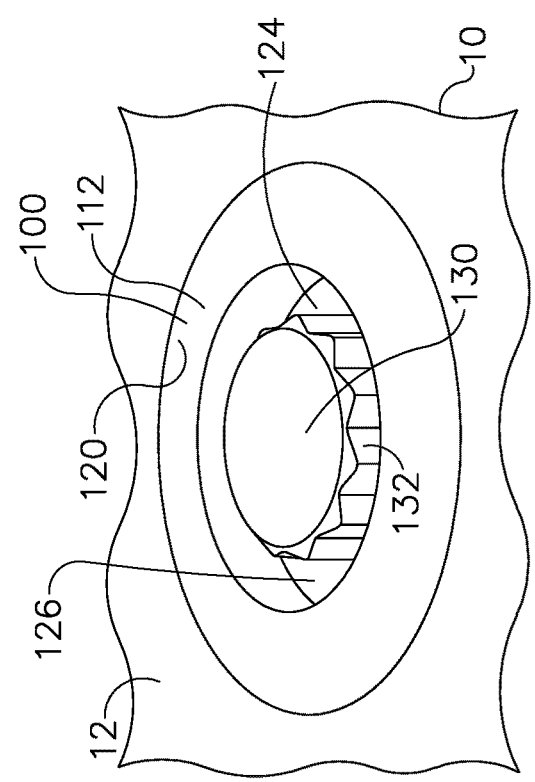
FIG. 10 is a perspective view illustration of the bolt head in an annular recess in the load spreader illustrated in FIG. 9.

Referring to FIGS. 3-4 and 8-11, the forward and aft bolts 113, 115 include boltheads 130 which have facets 132 for wrenching. The boltheads 130 fit and are disposed entirely within the cylindrical counterbore 120 and rest against and engage the shoulder 124. The cylindrical counterbore 120 is used for wrench access. Bolt shanks 136 extend away from the boltheads 130 and through the center bolt holes 116 of the forward and aft conical load spreaders 112, 114 and through the forward and aft base mounting holes 109, 110 of the bases 58. A nut 140 threaded on a threaded inner end 142 of each of the bolt shanks 136 engages an inner base surface 148 of the base 58 to secure the base 58 to the fan blade platform 10 along the radially inward mounting surface 74. FIGS. 8 and 11 illustrate radial gaps 100 between the boltheads 130 and cylindrical counterbore surfaces 102 of the cylindrical counterbores 120. A filler or filler ring 104 is disposed between the bolthead 130 and the cylindrical counterbore surface 102 of each of the cylindrical counterbores 120. The bolts and boltheads 130 may be hex head bolts and boltheads which require a socket wrench and wrench clearance provided by the gap 100. The wrenching clearance around the bolt head creates an opening in the flowpath which would disrupt the air flow, creating a performance penalty therefore the filler or filler ring 104 is provided to fill the opening and avoid the penalty. The filler rings 104 may be made of plastic, foam, metal or be composite rings bonded or press fitted in the forward and aft and conical load spreaders 112, 114 and encompass the bolt head. This ring fills the wrenching feature. Preferably, a coating 118 such as paint or a film bonded over the joint covering the boltheads 130 and the cylindrical counterbores 120 to create a smooth platform air flow surface 12 and protect this surface from particle erosion as illustrated in FIG. 6.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas turbine engine fan blade platform comprising:
   a forward portion, an aft portion and a transition portion therebetween;
   a mounting feature for securing the fan blade platform to a disk;
   a platform air flow surface on an opposite side of the fan blade platform from the mounting feature;
   the mounting feature having an increased section thickness in the transition portion;
   one or more platform mounting holes extending through the increased section thickness in the transition portion;
   one or more conical countersinks centered about one or more centerlines of the one or more platform mounting holes respectively extending into the transition portion;
   a clamping means including a conical load spreader with a center bolt hole disposed in each of the one or more conical countersinks for securing the transition portion of the fan blade platform to the disk, the conical load spreader defining a counterbore extending into a top of the conical load spreader and a shoulder at a bottom of the counterbore;
   a bolt having a bolthead disposed entirely within the counterbore; and
   a filler disposed in the counterbore between the bolthead and a counterbore surface.

2. The platform as claimed in claim 1 further comprising the one or more platform mounting holes and the one or more conical countersinks extending through a maximum thickness section of the transition portion.

3. The platform as claimed in claim 2 further comprising the platform being made of a composite material and having radially outwardly facing forward and aft notches in axially spaced apart forward and aft edges on the forward and aft portions respectively.

4. The platform as claimed in claim 3 further comprising a radially inward mounting surface of the mounting feature orthogonal to the one or more centerlines.

5. The platform as claimed in claim 1 further comprising the one or more platform mounting holes include axially spaced apart dual forward and aft platform mounting holes and the one or more conical countersinks include forward and aft conical countersinks extending through a maximum thickness section of the transition portion.

6. The platform as claimed in claim 5 further comprising the platform being made of a composite material and having radially outwardly facing forward and aft notches in axially spaced apart forward and aft edges on the forward and aft portions respectively.

7. The platform as claimed in claim 1 further comprising a conical angle of the one or more conical countersinks in a range of 75-85 degrees and the platform being made of a composite material.

8. A fan rotor assembly comprising:
a disk circumscribing an axis of rotation;
circumferentially spaced apart dovetail slots disposed about a rim of the disk and extending circumferentially between disk posts and extending axially from a forward disk end to an aft disk end;
fan blades including dovetail roots disposed in the dovetail slots and composite fan blade platforms located outward from and secured to the disk are circumferentially positioned between adjacent ones of the fan blades;
each of the composite fan blade platforms including a radially outwardly facing platform air flow surface and a forward portion, an aft portion and a transition portion therebetween;
a mounting feature on a radially inwardly facing side of the composite fan blade platform for securing the composite fan blade platform to the disk;
the mounting feature having an increased section thickness in the transition portion;
at least one platform mounting hole including a centerline extending through the increased section thickness in the transition portion;
a conical countersink extending into the transition portion centered around the centerline of the at least one platform mounting hole;
a clamping means including a conical load spreader with a center bolt hole disposed in the conical countersink for securing the transition portion of the composite fan blade platform to the disk, the conical load spreader defining a counterbore extending into a top of the conical load spreader and a shoulder at a bottom of the counterbore;
a bolt having a bolthead disposed entirely within the counterbore; and
a filler disposed in the counterbore between the bolthead and a counterbore surface.

9. The assembly as claimed in claim 8 wherein the bolt further includes a bolt shank extending away from the bolthead and through the center bolt hole.

10. The assembly as claimed in claim 9 wherein the counterbore is a cylindrical recess, wherein the counterbore surface is a cylindrical counterbore surface, wherein the bolthead rests against and engages the shoulder, and wherein the filler is a filler ring disposed between the bolthead and the cylindrical counterbore surface in a radial gap between the bolthead and the counterbore surface of the cylindrical recess.

11. The assembly as claimed in claim 10 further comprising a coating bonded over the platform air flow surface, wherein the coating covers the bolthead and the cylindrical counterbore.

12. The assembly as claimed in claim 9 further comprising:
at least one disk hook attached, fixed or joined to, or integral with the disk posts of the disk,
at least one platform support including a hook base connected to a curved platform hook arm and bolted with the bolt to the increased section thickness of the mounting feature along a radially inward mounting surface of the mounting feature,
the platform hook arm engaging a disk hook arm of the at least one disk hook, and
a nut threaded on a threaded inner end of the bolt shank and engaging an inner base surface of the hook base for securing the base to the composite fan blade platform along the radially inward mounting surface.

13. The assembly as claimed in claim 12 wherein the counterbore is a cylindrical recess, wherein the counterbore surface is a cylindrical counterbore surface, wherein the bolthead rests against and engages the shoulder, and wherein the filler is a filler ring disposed between the bolthead and the cylindrical counterbore surface in a radial gap between the bolthead and the counterbore surface of the cylindrical recess.

14. The assembly as claimed in claim 13 further comprising a coating bonded over the platform air flow surface covering the boltheads and the cylindrical counterbores.

15. The assembly as claimed in claim 12 further comprising:
forward and aft supports supported by forward and aft disk ends respectively of the disk, and
the forward and aft supports including forward and aft overhangs mating with radially outwardly facing forward and aft notches in axially spaced apart forward and aft edges on the forward and aft portions respectively.

16. The assembly as claimed in claim 15 wherein the counterbore is a cylindrical recess, wherein the counterbore surface is a cylindrical counterbore surface, wherein the bolthead rests against and engages the shoulder, and wherein the filler is a filler ring disposed between the bolthead and the cylindrical counterbore surface.

17. The assembly as claimed in claim 16 further comprising a coating bonded over the platform air flow surface covering the boltheads and the cylindrical counterbores.

18. The assembly as claimed in claim 8 further comprising a conical angle of the conical countersink in a range of 75-85 degrees and the platform being made of a composite material.

19. A fan rotor assembly comprising:
a disk circumscribing an axis of rotation;
circumferentially spaced apart dovetail slots disposed about a rim of the disk and extending circumferentially between disk posts and extending axially from a forward disk end to an aft disk end;
fan blades including dovetail roots disposed in the dovetail slots and composite fan blade platforms located outward from and secured to the disk are circumferentially positioned between adjacent ones of the fan blades;
each of the fan blade platforms including a radially outwardly facing platform air flow surface and a forward portion, an aft portion, and a transition portion therebetween;
a mounting feature on a radially inwardly facing side of the fan blade platform for securing the fan blade platform to the disk;
the mounting feature having an increased section thickness in the transition portion;
axially spaced apart dual forward and aft platform mounting holes having forward and aft centerlines respectively extending through the increased section thickness in the transition portion;

forward and aft conical countersinks extending into the transition portion and centered around the forward and aft centerlines respectively;

a clamping means for securing the transition portion of the fan blade platform to the disk;

the clamping means including forward and aft conical load spreaders disposed in the forward and aft conical countersinks and circumscribing the forward and aft centerline respectively, the forward and aft load spreaders each defining a counterbore extending into a top of the respective conical load spreader and a shoulder at a bottom of the respective counterbore;

a pair of center bolt holes, each center bolt hole extending through one of the forward conical load spreader or the aft conical load spreader; and a bolt including a bolthead engaging each of the forward and aft conical load spreaders and a bolt shank extending away from the bolthead and through the center bolt hole, the bolthead of each bolt disposed entirely within the respective counterbore; and a filler disposed in each counterbore between the respective bolthead and a respective counterbore surface.

20. The assembly as claimed in claim 19 further comprising:

the clamping means including a disk hook attached, fixed, or joined to, or integral with the disk posts of the disk, the clamping means further including a platform support with a hook base connected to a curved platform hook arm and bolted with the bolt to the increased section thickness of the mounting feature along a radially inward mounting surface of the mounting feature, the platform hook arm engaging a disk hook arm of the disk hook, and a nut threaded on a threaded inner end of the bolt shank and engaging an inner base surface of the base for securing the base to the fan blade platform along the radially inward mounting surface.

21. The assembly as claimed in claim 20 wherein the counterbore is cylindrical recess, wherein the counterbore surface is a cylindrical counterbore surface, wherein the bolthead rests against and engages the shoulder, and wherein the filler is a filler ring disposed between the bolthead and the cylindrical counterbore surface in a radial gap between the bolthead and the counterbore surface of the cylindrical counterbore.

22. The assembly as claimed in claim 21 further comprising a coating bonded over the platform air flow surface covering the boltheads and the cylindrical counterbores.

23. The assembly as claimed in claim 21 further comprising:

forward and aft supports supported by forward and aft disk ends respectively of the disk, and the forward and aft supports including forward and aft overhangs mating with radially outwardly facing forward and aft notches in axially spaced apart forward and aft edges on the forward and aft portions respectively.

24. The assembly as claimed in claim 23 further comprising a coating bonded over the platform air flow surface covering the boltheads and the cylindrical counterbores.

25. The assembly as claimed in claim 19 further comprising a conical angle of the conical countersink in a range of 75-85 degrees and the platform being made of a composite material.

* * * * *